United States Patent [19]

Sears

[11] 4,221,450
[45] Sep. 9, 1980

[54] BATTERY HOLD DOWN-TERMINAL CONNECTOR

[75] Inventor: Hartley M. Sears, Costa Mesa, Calif.

[73] Assignee: Schick Laboratories, Inc., Los Angeles, Calif.

[21] Appl. No.: 8,059

[22] Filed: Jan. 31, 1979

[51] Int. Cl.³ .................. H01R 13/62; H01M 2/10
[52] U.S. Cl. .................................. 339/75 R; 429/100
[58] Field of Search .............. 429/1, 121, 96, 97, 429/98, 100; 339/224, 75 R, 75 M, 75 P, 75 T, 198 J, 136 R, 17 D, 91 R, 191 R, 125 R, 166 R, 192, 17 D, 191 A; 46/45, 228, 248; 324/29.5; 320/47; 340/636

[56] References Cited

U.S. PATENT DOCUMENTS

| | | | |
|---|---|---|---|
| 1,325,865 | 12/1919 | Shreeve | 339/17 D |
| 2,350,941 | 6/1944 | Stevenson | 339/191 A X |
| 2,519,121 | 8/1950 | Delcamp | 339/17 D |
| 2,989,722 | 6/1961 | O'Donnell | 339/191 R |
| 3,017,598 | 1/1962 | Low | 339/91 R X |
| 3,020,509 | 2/1962 | Whelen | 339/91 R |
| 3,314,042 | 4/1967 | Gabrielian | 339/17 D X |
| 3,431,537 | 3/1969 | Klingenberg | 339/75 P |
| 3,742,428 | 6/1973 | Rathband | 339/75 R |
| 4,118,133 | 10/1978 | Kupfer | 339/75 R X |

FOREIGN PATENT DOCUMENTS

304719  1/1933  Italy ................... 339/125 R

Primary Examiner—John McQuade
Assistant Examiner—John S. Brown
Attorney, Agent, or Firm—Martin R. Horn

[57] ABSTRACT

An apparatus for creating an electrical connection to a battery having protruding terminals from one side of it. A surface is provided against which the side of the battery containing its terminals is biased via an appropriate hook shaped retainer. The protruding terminals of the battery are inserted into holes in the surface, and protrude from the opposite side of the surface. When protruding from the opposite side of the surface, they come into electrical and mechanical contact with suitable connectors, thereby forming the desired connection, and allow use of the battery in an electrical circuit as a power supply. The battery may be easily removed by a suitable repositioning of the retainer.

6 Claims, 1 Drawing Figure

U.S. Patent  Sep. 9, 1980  4,221,450
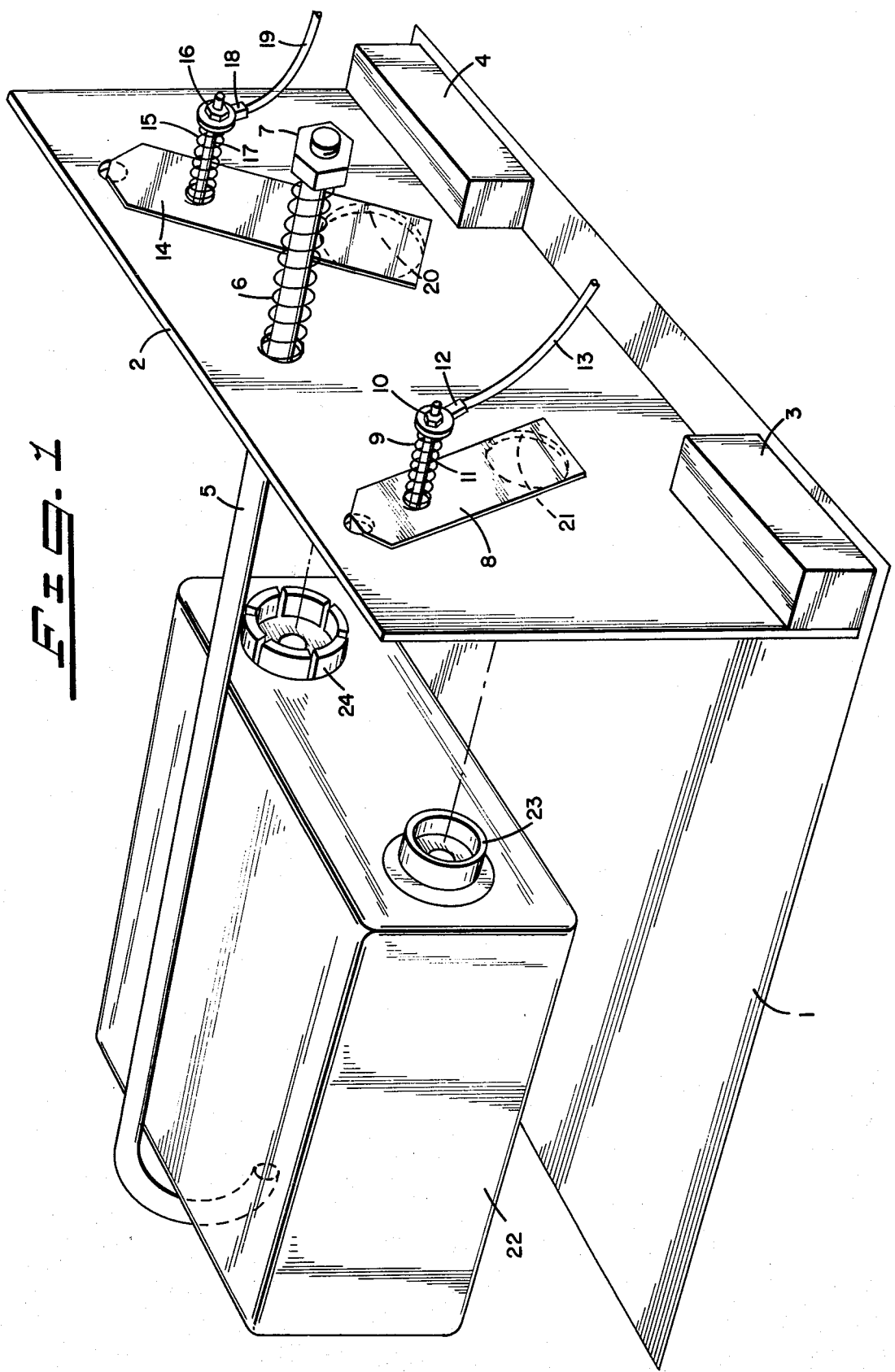

BATTERY HOLD DOWN-TERMINAL CONNECTOR

BACKGROUND OF THE INVENTION

1. Field of the Invention

This invention relates to electrical connectors suitable for use with electrical batteries.

2. Prior Art

In the marketplace are a variety of electrical connectors suitable for use in making an electrical connection to batteries. Such connectors have been designed with certain design criteria in mind. Some factors which must be considered in the design of such devices include: (1) the mechanical construction and layout of the batteries to which connection is desired, (2) the electrical parameters of the circuit which the connectors will form, (3) the ease in which the connection may be formed, (4) the expected frequency of connection and disconnection which the connector will be subjected to, and (5) the desired cost for the connector.

Battery connectors span the range of applications from use in hearing aids and other similar miniaturized devices to automobile batteries, to the telephone network and other applications requiring an enormous amount of power to be stored for use in situations where the commercial AC power network is unavailable or unreliable.

It is an objective of the herein disclosed invention to provide a simple connector apparatus suitable for use with batteries having protruding terminals from one side which allows the battery to be used as a power supply in an electrical circuit. It is a further objective that the connector be inexpensive to manufacture, and may possibly use existing components in the utilization apparatus in order to minimize the additional cost of the connectors. Furthermore, it is an objective to provide a connector which allows for the ready and repeated disconnection and removal of the battery.

SUMMARY OF THE INVENTION

These and other objectives are achieved by the herein disclosed invention by a connection device consisting of a surface against which the battery is biased by a hook shaped retainer. The protruding terminals of the battey are inserted into appropriately sized and positioned holes in the surface, thereby protruding from the opposite side of the surface. Biased against the protruding terminals are electrical conductors suitable for providing the desired electrical connection to the battery, thereby allowing the battery to be used as a power source for an electrical circuit. Mechanical positioning of the battery is aided by the biasing retainer which causes the battery to suitably engage the surface. The hook is also easily positioned to allow for the ready removal of the battery.

BRIEF DESCRIPTION OF THE DRAWINGS

FIG. 1 is a perspective view of an embodiment of the herein disclosed invention.

DETAILED DESCRIPTION OF THE PREFERRED EMBODIMENT

FIG. 1 illustrates an embodiment of the herein disclosed invention, in which a battery 22 having protruding terminals 23, 24 is biased by a retaining hook 5 against a connector surface 2. While biased against the connector surface 2, the battery 22 is also positioned against support surface 1. Support surface 1 and connector surface 2 are positioned at right angles to each other via support blocks 3, 4. The retaining hook 5 causes the battery 22 to be drawn against support surfaces 1 and connecting surface 2. Retaining hook 5 consists of a long rod bent into a hook at one end. The rod 5 protrudes through a hole in the connecting surface 2. On the side of the connecting surface 2 opposite the battery, a coil spring 6 is positioned around the rod 5 and retained between the connecting surface 2 and the end of the rod via a nut 7 threaded on the rod. The coil spring 6 seeks to draw the rod 5 and hook end through the hole in the connector surface 2. When a battery 22 is positioned as illustrated in FIG. 1, coil spring 6 causes rod 5 to snugly draw the battery 22 against the connector surface 2. The rod may be positioned on the connector surface 2 so that it also serves to guide the battery between it and the support surface 1. In this way, the battery is supported on three sides via its contact with the support surface 1, the connector surface 2, and the rod 5.

In an alternative embodiment of of the invention, the requirement for a support for the battery is provided for in a manner not requiring a support surface 1. In a part of the chassis of the device using the battery, a hole is cut. The hole is suitably sized to allow the battery to be inserted terminal side first into the hole. Directly below the hole and suitably positioned to engage the terminals of the battery is placed the connector surface 2. The battery is constrained from moving from side to side by the size and shape of the hole. It is biased against the connector surface by a retaining hook 5.

Appropriately positioned on the connector surface 2 are two holes 21, 20. These holes are so positioned to allow the corresponding terminals 23, 24 of the battery to enter the hole and protrude from the opposite side of the connector surface 2. Each hole 20, 21 may be appropriately sized to be the minimum required to allow entrance by the associated battery terminal.

In one embodiment of the invention, the connector apparatus was designed for use with nine volt batteries having industry specification NEDA 1604A, such as "Everready Alkaline Power Cell No. 522", a trade marked product available commercially. A battery according to this specification contains two protruding terminals on one side. The negative terminal 24 is larger in diameter than the positive terminal 23. For such a battery, terminal hole 21 would be sized sufficiently large to enable the positive terminal 23 to enter it, yet be sufficiently small to prohibit the entrance of the negative terminal. In such an embodiment, it would be impossible for the negative terminal 24 to come into electrical contact with the positive electrical connector 8 associated with hole 21 and positive battery terminal 23, thereby preventing a reverse polarity connection from being made. Positioned over each hole 20, 21 is an electrical conductor connector 8, 14. Positive conductor connector 8 is biased against its associated hole 21 via a bias spring 9, bolt 12 and nut 10. This mechanical arrangement serves to bias the connector 8 against the hole, causing it to come into electrical and mechanical contact with its associated battery terminal 23 when the battery is positioned against the connector surface 2. An appropriate spade lug is attached to bolt 9, providing a permanent electrical connection between the positive conductor connector 8 and a circuit wire 13. Circuit wire 19 is appropriately connected to the negative conductor connector 14 via its spade lug 18. Connector 14 is biased via spring 15, bolt 17 and nut 16 against its associated hole 20 in the conductor surface 2. Accordingly, conductor 14 come into electrical and mechanical contact with terminal 24 when the battery is suitably positioned against the conductor surface 2.

When the battery is so biased against the electrical conductor connectors 8, 14, it is able to provide power to an electrical circuit via circuit wires 13 and 19.

It will be readily apparent to those skilled in the art that changes and modifications in the herein disclosed invention may be made without departing from the spirit of the invention disclosed herein. For instance, the invention is suitable for use with batteries having more or less than two protruding terminals. Additionally, the connectors 14, 8 may be of suitable springy material, thereby not requiring the use of a bias spring arrangement 9, 15 to securely bias them against the corresponding battery terminal. Additionally, the permanent circuit attached to the conductor connectors may be performed in any of a variety of ways such as directly soldering the circuit wires to the connectors or directly forming a pin on an end of the conductor connectors suitable for direct insertion into a printed circuit board. Therefore, the foregoing disclosure, description, and figure are for illustrative purposes only and do not in any way limit the invention, which is defined only by the claims.

I claim:

1. An apparatus for providing an electrical connector to a battery having plural electrical terminals protruding from one side, comprising:

connector support means for supporting said battery during said electrical connection, said support means including a member with first and second sides and having plural terminal holes, said second side parallel to and separated from said first side by a distance less than said terminals protrude from said battery, each said terminal hole associated with a unique one of said protruding terminals, said terminal holes passing through said member between said first and second sides, and so positioned and sized to allow said battery terminals to protrude from said second side when the terminal side of said battery abuts said first side with each of said protruding battery terminals inserted in its associated terminal hole;

retaining means for biasing said battery terminal side against said first side; and plural conductor means, each attached to said second side and covering but not entering a portion of an associated terminal hole, each said conductor means for electrically contacting the portion of the terminal associated with said terminal hole protruding from said second side, said retaining means for biasing said battery terminal side against said first side comprising a rod extending slidably through said member and having a hook at one end for engaging the battery at the side thereof opposite the battery terminals and urging the battery terminal side against said first side of said member, said retaining means further comprising resilient means on said second side for urging said hook toward said first side, whereby said rod may be slid to move the said hook away from the said member to release said battery and permit removal thereof.

2. An apparatus according to claim 1 wherein at least one terminal hole is so sized to prohibit insertion of battery terminals other than its associated battery terminal.

3. An apparatus according to claim 1 wherein said retaining means may be rotated away from contact with said battery, thereby permitting said battery to be removed from said apparatus.

4. An apparatus according to claim 1 for use with a device having a chassis, comprising:

a hole in said chassis of size and shape to allow insertion of said battery terminal side first; and said connector support means positioned below said hole to allow insertion of said battery terminals into said terminal holes.

5. An apparatus according to claim 1 wherein said connector support means comprises a side support surface to support at least a portion of a side of said battery not containing said protruding battery terminals.

6. The apparatus of claim 1, and a side support surface prependicular to said first member, for supporting said battery, said rod being positioned on said first member so that it serves to guide the battery between it and the support surface.

* * * * *